United States Patent
Lewis et al.

(10) Patent No.: US 9,407,462 B2
(45) Date of Patent: Aug. 2, 2016

(54) SYSTEM AND METHOD TO FACILITATE COMMUNICATIONS AND CONTENT SHARING AMONG USERS OVER A NETWORK

(75) Inventors: Michael Pescatello Lewis, Washington, DC (US); Cameron Shaw, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 13/620,598

(22) Filed: Sep. 14, 2012

(65) Prior Publication Data
US 2013/0080915 A1 Mar. 28, 2013

Related U.S. Application Data

(63) Continuation of application No. 12/987,788, filed on Jan. 10, 2011, which is a continuation of application No. 10/536,216, filed as application No. PCT/US03/37885 on Nov. 24, 2003, now Pat. No. 7,870,197.

(51) Int. Cl.
| | |
|---|---|
| G06F 15/16 | (2006.01) |
| H04L 12/58 | (2006.01) |
| H04L 29/06 | (2006.01) |
| H04L 29/08 | (2006.01) |

(52) U.S. Cl.
CPC ........ *H04L 12/581* (2013.01); *H04L 29/06027* (2013.01); *H04L 51/04* (2013.01); *H04L 65/4007* (2013.01); *H04L 67/1063* (2013.01); *H04L 67/1085* (2013.01); *H04L 67/22* (2013.01); *H04L 67/104* (2013.01); *H04L 67/306* (2013.01)

(58) Field of Classification Search
USPC ........................................................ 709/206
See application file for complete search history.

(56) References Cited

U.S. PATENT DOCUMENTS

| | | |
|---|---|---|
| 5,991,824 A | 11/1999 | Strand et al. |
| 6,219,669 B1 | 4/2001 | Haff et al. |
| 6,248,946 B1 | 6/2001 | Dwek |
| 6,496,851 B1 | 12/2002 | Morris et al. |
| 6,691,162 B1 | 2/2004 | Wick |
| 6,769,015 B1 | 7/2004 | Bates et al. |

(Continued)

FOREIGN PATENT DOCUMENTS

| | | |
|---|---|---|
| JP | 2003067276 | 3/2003 |
| KR | 2001083827 | 7/2001 |

(Continued)

OTHER PUBLICATIONS

Cherry, S.M. "IM Means Business" Spectrum, IEEE. vol. 39, Issue 11. Nov. 2002.

(Continued)

*Primary Examiner* — Sulaiman Nooristany
(74) *Attorney, Agent, or Firm* — Keller Jolley Preece

(57) ABSTRACT

A system and method to facilitate real-time communications and content sharing among users over a network are described. In one preferred embodiment, multiple links to content information are dynamically generated for a sender user. Responsive to selection of a link by the sender user, the link and associated metadata information are communicated to at least one recipient user engaged in the real-time communications session with the sender user.

24 Claims, 9 Drawing Sheets

(56) References Cited

U.S. PATENT DOCUMENTS

| | | | |
|---|---|---|---|
| 7,080,139 | B1 | 7/2006 | Briggs et al. |
| 7,870,197 | B2 | 1/2011 | Lewis |
| 2001/0018858 | A1* | 9/2001 | Dwek ............................ 84/609 |
| 2002/0027567 | A1 | 3/2002 | Niamir |
| 2002/0073149 | A1 | 6/2002 | Young |
| 2002/0120783 | A1 | 8/2002 | Evgey |
| 2002/0165940 | A1 | 11/2002 | Kameoka et al. |
| 2003/0009518 | A1 | 1/2003 | Harrow et al. |
| 2003/0009570 | A1 | 1/2003 | Moskowitz |
| 2003/0023427 | A1 | 1/2003 | Cassin et al. |
| 2003/0028451 | A1 | 2/2003 | Ananian |
| 2003/0061287 | A1 | 3/2003 | Yu et al. |
| 2003/0065774 | A1 | 4/2003 | Steiner et al. |
| 2003/0097299 | A1 | 5/2003 | O'Kane et al. |
| 2003/0100965 | A1 | 5/2003 | Strick et al. |
| 2003/0105812 | A1 | 6/2003 | Flowers et al. |
| 2003/0110925 | A1 | 6/2003 | Strick et al. |
| 2003/0110926 | A1 | 6/2003 | Strick et al. |
| 2003/0171982 | A1 | 9/2003 | Paul |
| 2003/0225823 | A1* | 12/2003 | Meeuwissen ........... G06F 9/542 709/203 |
| 2003/0225834 | A1* | 12/2003 | Lee et al. ...................... 709/204 |
| 2003/0225846 | A1 | 12/2003 | Heikes et al. |
| 2003/0236832 | A1* | 12/2003 | McIntyre ................ H04L 29/06 709/204 |
| 2004/0030750 | A1 | 2/2004 | Moore et al. |
| 2004/0172451 | A1 | 9/2004 | Biggs et al. |
| 2008/0027909 | A1 | 1/2008 | Gang et al. |
| 2011/0173547 | A1 | 7/2011 | Lewis |

FOREIGN PATENT DOCUMENTS

| | | |
|---|---|---|
| KR | 2001083828 | 7/2001 |
| KR | 200207759 | 6/2002 |
| WO | WO 2004/049182 | 6/2004 |

OTHER PUBLICATIONS

Drews, C. et al, "Virtual Jukebox: Reviving a Classic", Proceedings of the 335th Annual Hawaii International Conference on System Sciences, pp. 887-893, IEEE Comput. Soc, Los Alamitos, CA, USA Jan. 2002.

Grimm, R. et al. "Peer to Peer Music Sharing with Profit but Without Copy Protection", Proceedings Second International Conference on WEB Delivering of Music WEBELMUSIC 2002, pp. 17-22; IEEE Comput. Soc. Los Alamitos, CA, USA 2002.

Bellini, P. et al. "Multimedia Music Distribution and Sharing Among Mediatiques, Archives and Their Attendees", Proceedings Second International Conference on WEB Delivering of Music, WEDELMUSIC 2002, pp. 23-29, IEEE Comput. Soc., Los Alamitos, CA, USA 2002.

Hayes, C. et al. "Programme Driven Music Radio", ECAI 2002 15th European Conference on Artificial Intelligence Proceedings, pp. 633-637; IOS Press, Amsterdam, Netherlands May 2002.

Ng, W.; "A Self-Configurable Peer to Peer System"; Department of Computer Science, National University of Singapore, Feb.-Mar. 2002.

Roibas, A.C., "The Users' Perspective of Context Dependent Systems" 2003.

Roman, M., et al. "A User-Centric, Resource-aware, Context-sensitive, Multi-device Application framework for Ubiqutious Computing Environments"; Department of Computer Science, Univ. of Illinoise at Urbana-Champagne, Jul. 2002.

Hyoung-Do, K., "A Virtual Music Network service Scalable to Network and terminal Charachteristics", Proceedings of the 1996 Pacific Workshop on Distributed Multimedia Systems, pp. 246-250, Knowledge Syst. Inst. Skokie, IL, USA, 1996.

Macedonia. M., "Distributed File Sharing: Barbarians at the gates?"; computer, vol. 33, No. 8, pp. 99-101, IEEE Comput. Soc, USA, Aug. 2000.

Adar, E. et al. "Free Riding on Gnutella"; First Monday, vol. 5 No. 10, Oct. 2000.

Barnhart, A.; Share and Share Alike [P2P Technology]: Software Development, vol. 9, No. 2, pp. 31-35, Miller-Freeman; Feb. 2001.

Delaney B.; "The Power of P2P", IEEE Multimedia, vol. 8, No. 2, pp. 100-103; IEEE, USA, Apr.-Jun. 2001.

Hayes, C., et al. "Smart Radio-Building Music on the Fly", Applications and Innovations in Intelligent Systems VIII. Proceedings of ES2000, the Twentieth SGES International Conference on Knowledge Based Systems and Applied Artificial Intelligence, pp. 129-138; Springer-Verlag London, UK Dec. 2000.

Hayes, C., et al. "Smart Radio—Community Based Music Radio", Knowledge-Based Systems, vol. 14, No. 3-4, pp. 197-201, Elsevier, UK, 2001.

Hummel, J. et al. "The Community Model of Content Management"; Towards the E-society: E-Commerce, E-Business, E-Government (vol. 74) pp. 231-246; Kluwer Academic Publisher, Norwell, MA. USA, 2001.

Lechner, U.; "Peer to Peer File Sharing"; Innovative Internet Computing Systems. Second International Workshop, IICS 2002. Proceedings (Lecture Notes in Computer Science vol. 2346) pp. 229-249; Springer-verlag, Berlin Germany 2002.

Mitsuoka, M., Watanabe, S., Kakuta, J., Okuyama, S., "Instant Messaging with Mobile Phones to Support Awareness", Applications and the Internet, Jan. 2001. pp. 223-230.

International Search Report as received in PCT/US03/37885 on Jun. 10, 2004.

U.S. Appl. No. 10/536,216, filed Mar. 16, 2009, Office Action.
U.S. Appl. No. 10/536,216, filed Mar. 29, 2010, Office Action.
U.S. Appl. No. 10/536,216, filed Sep. 1, 2010, Notice of Allowance.
U.S. Appl. No. 12/987,788, filed Aug. 2, 2012, Office Action.
U.S. Appl. No. 12/987,788, filed May 13, 2013, Office Action.
U.S. Appl. No. 12/987,788, filed Aug. 23, 2013, Office Action.
U.S. Appl. No. 12/987,788, filed Jan. 24, 2014, Office Action.
U.S. Appl. No. 12/987,788, filed Mar. 4, 2015, Office Action
U.S. Appl. No. 12/987,788, filed Sep. 2, 2015, Office Action.

\* cited by examiner

SYSTEM AND METHOD TO FACILITATE COMMUNICATIONS AND CONTENT SHARING AMONG USERS OVER A NETWORK

CROSS-REFERENCE TO RELATED APPLICATIONS

The present application is a continuation of U.S. application Ser. No. 12/987,788, filed Jan. 10, 2011, which is a continuation of U.S. application Ser. No. 10/536,216, filed Sep. 29, 2005, which is now issued as U.S. Pat. No. 7,870,197, which is a 371 national stage application of international application number PCT/US03/37885, filed Nov. 24, 2003. Each of the aforementioned patent(s) and application(s) are hereby incorporated by reference in their entirety.

BACKGROUND OF THE INVENTION

1. Field of the Invention

The invention relates generally to the field of network-based communications and, more particularly, to a system and method to facilitate real-time communications and content sharing among users over a network, such as the Internet.

2. Description of the Related Art

The explosive growth of the Internet as a publication and interactive communication platform has created an electronic environment that is changing the way business is transacted and the way entertainment is perceived. As the Internet becomes increasingly accessible around the world, communications among users increase exponentially.

Several attempts have been made to facilitate such network-based communications, namely to provide software packages residing on a computer and configured, for example, to acquire digital content from content providers over a network, such as the Internet, and to facilitate sharing of the digital content among the users. However, the increased popularity of some of these software packages may give rise to legal problems in the areas of ownership and protection of the acquired digital content. For example, many of the current content sharing software applications rely on anonymous usage. Thus, there is an increased risk of unauthorized use of the content in violation of content protection laws.

SUMMARY OF THE INVENTION

A system and method to facilitate real-time communications and content sharing among users over a network are described. In one preferred embodiment, multiple links to content information are dynamically generated for a sender user. Responsive to selection of a link by the sender user, the link and associated metadata information are communicated to at least one recipient user engaged in the real-time communication session with the sender user.

DETAILED DESCRIPTION OF THE INVENTION

Figure 1:
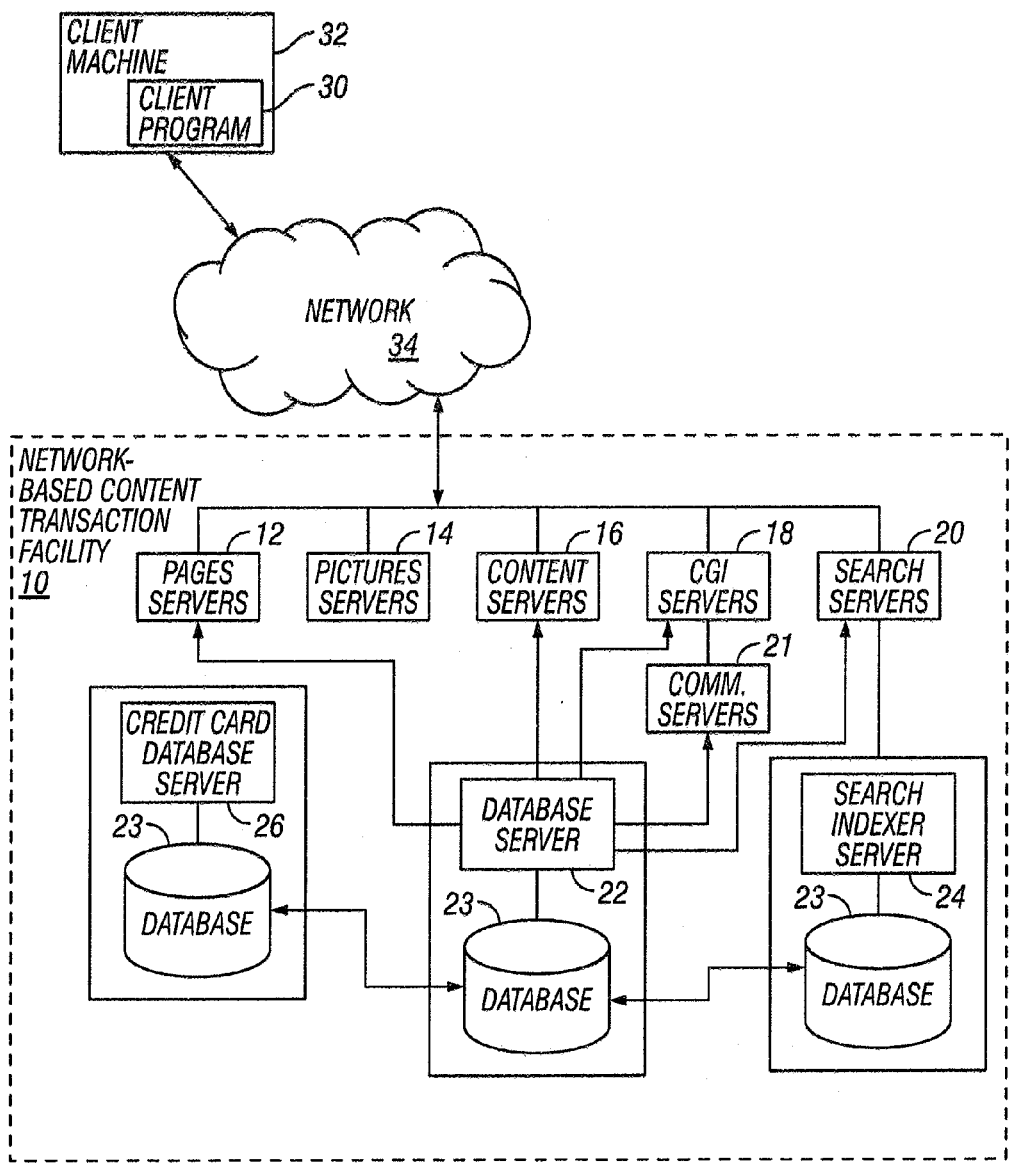
FIG. 1 is a block diagram illustrating an exemplary network-based content transaction and communications facility, which facilitates content sharing among users according to the invention.

FIG. 1 is a block diagram illustrating an exemplary network-based content transaction and communications facility 10, which facilitates content sharing among users. While an exemplary embodiment of the invention is described within the context of a content transaction and communications facility, it will be appreciated by those skilled in the art that the invention will find application in many different types of computer-based, and network-based, commerce facilities.

The facility 10 includes one or more of a number of types of front-end servers, namely page servers 12, which deliver web pages to multiple users, e.g. markup language documents, picture servers 14, which dynamically deliver images to be displayed within the web pages, content servers 16, which dynamically deliver content information to the users, such as, for example, audio and video data, processing servers in the exemplary form of Common Gateway Interface (CGI) or Internet Server Application Program Interface (ISAPI) servers 18, which provide an intelligent interface to the back-end of the facility 10, and processing search servers 20, which handle search requests to the facility 10. In addition, the facility 10 includes real-time communication servers 21 that provide, inter alia, automated real-time communications, such as, for example, instant messaging (IM) functionality, to/from users of the facility 10, and electronic mail (email) servers (not shown), which provide automated email communications to/from users.

The facility 10 further includes one or more back-end servers, for example, a database server 22, a search indexer server 24, and a credit card database server 26, each of which maintains and facilitates access to a respective database 23. The network-based content transaction facility 10 may be accessed by a client program 30, such as a browser, e.g. the Internet Explorer browser distributed by Microsoft Corporation of Redmond, Wash., that executes on a client machine 32 and accesses the facility 10 via a network 34, such as, for example, the Internet. Other examples of networks that a client may utilize to access the facility 10 includes a wide area network (WAN), a local area network (LAN), a wireless network, e.g. a cellular network, the Plain Old Telephone Service (POTS) network, or other known networks.

Figure 2:
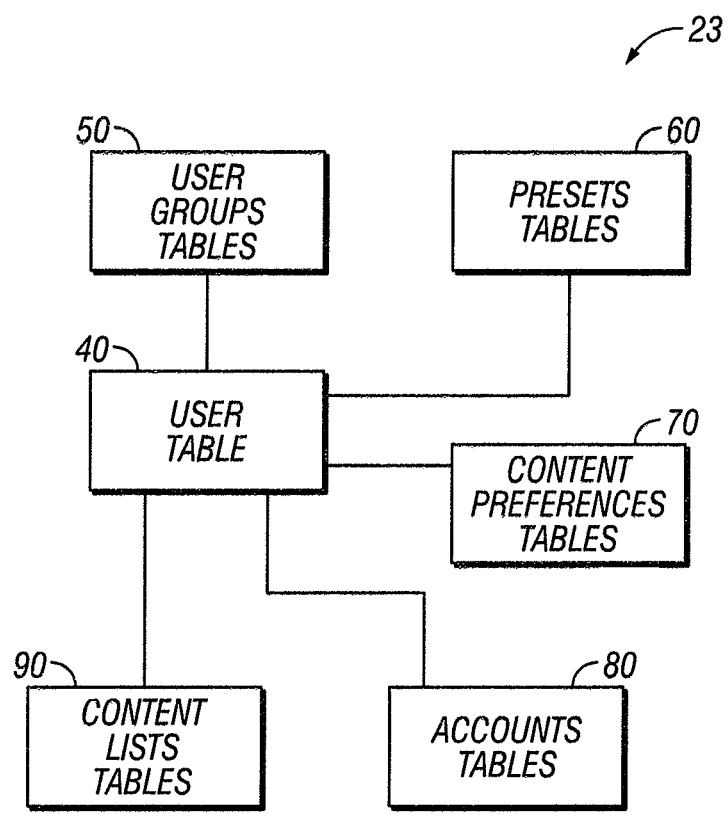
FIG. 2 is a block diagram illustrating an exemplary database, maintained by and accessed via a database server, which at least partially implements and supports the network-based content transaction and communications facility according to the invention.

FIG. 2 is a block diagram illustrating an exemplary database 23, maintained by and accessed via a database server, which at least partially implements and supports the network-based content transaction and communications facility 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

Central to the database 23 shown in FIG. 2 is a user table 40, which contains records for each entity or user of the facility 10. The database 23 also includes an accounts table 80, which may be linked to the user table 40 and may be populated with account information related to each user of the network-based facility 10.

The database 23 may include a number of other tables, which may also be shown to be linked to the user table 40, for example, tables specifically provided to enable an exemplary embodiment of the present invention. One or more content preferences tables 70 are configured to store user-generated content preferences and/or selections, part of a user profile constructed and stored for each user. One or more presets tables 60 are configured to store another portion of each user profile, which includes user-generated media presets, such as, for example, radio station presets accessed by each specific user and radio station presets reported as preferred by each user. One or more user groups tables 50 are configured to store user-generated content group lists, each list grouping users interested in similar content, for example users interested in particular audio files and/or video files. Finally, one or more content lists tables 90 are configured to store user-generated content lists, each list grouping similar content items preferred by the particular user, such as, for example, preferred audio files lists and video files lists. Prior to any communication between client 32 and the network-based facility 10, each media preset and/or user preference is generated and stored in the respective tables 60, 70. In one embodiment, each user has continuous access to the user profile and may modify at anytime the content preferences, the media presets, the content group lists, and the content lists.

Figure 3:
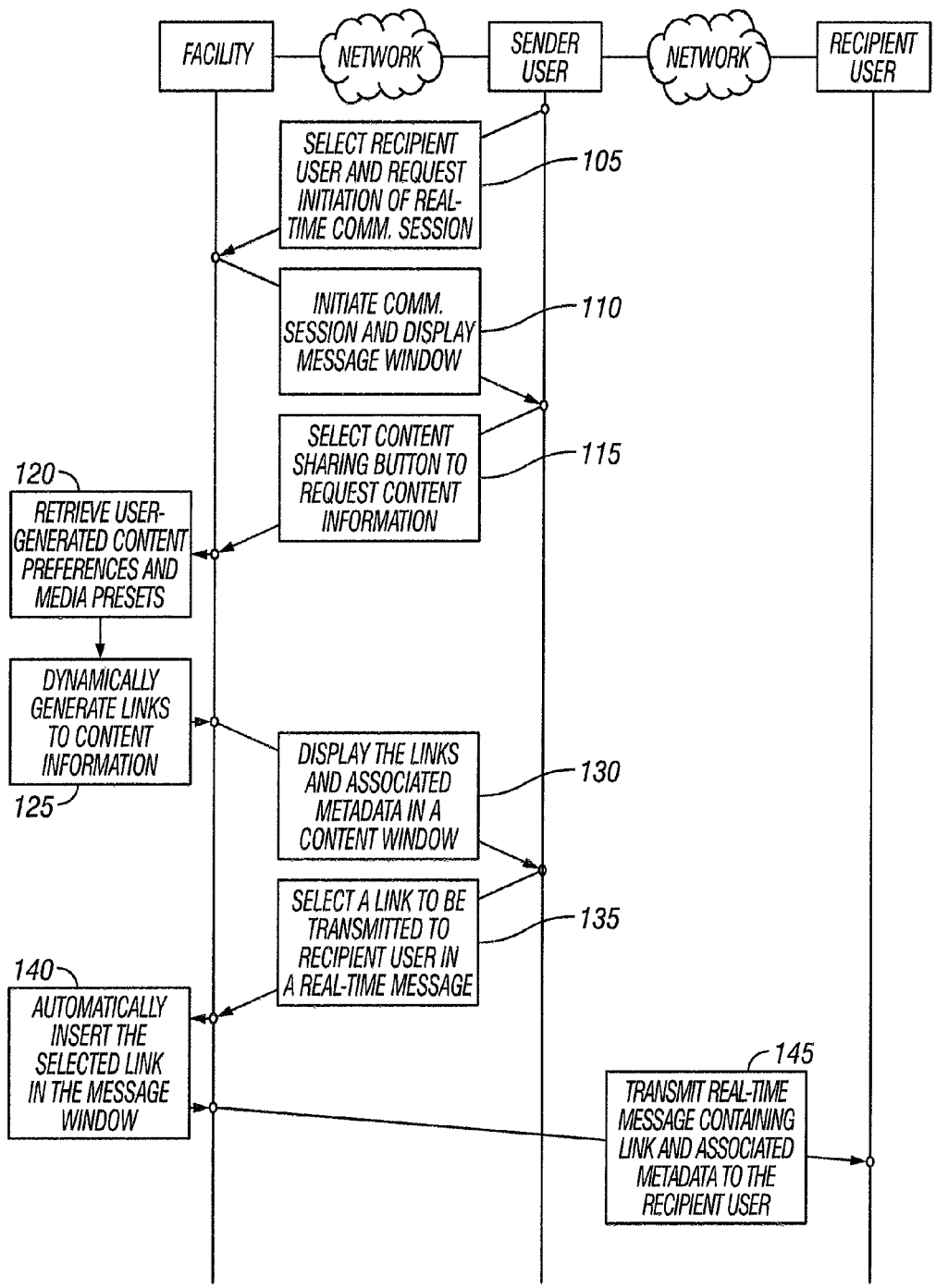
FIG. 3 is an interaction diagram illustrating a sequence of interactions to facilitate real-time communications and content sharing among users over the network according to an exemplary embodiment of the invention.

FIG. 3 is an interaction diagram illustrating a sequence 100 of interactions to facilitate real-time communications and content sharing among users, in the exemplary form of a sender user 101 and a recipient user 102. FIGS. 4A-4E illustrate exemplary interfaces to facilitate real-time communications and content sharing among users over the network. While the sequence 100 describes a client-server environment, whereby communications between the sender and recipient users 101 and 102 are facilitated by, or performed through, the network-based facility 10, it will also be appreciated that the teachings of the invention may be applied to a peer-to-peer environment, whereby the users 101 and 102 communicate directly and not through the facility 10, or may be applied to a client-server environment functioning over another real-time communications network.

As illustrated in FIG. 3, in one embodiment, the sequence 100 commences at block 105 with selection by the sender user 101 of a recipient user 102 and a request to initiate a real-time communication session with the recipient user 102, such as, for example, an instant messaging (IM) communication session. The recipient user 102 may be selected, in one embodiment, with a conventional mouse click command from a user list, such as, for example, a drop-down list or a menu list, the list containing multiple users and user groups available to participate in the real-time communication session with the sender user 101, for example online users capable of exchanging IM messages. The facility 10 uses the search servers 20 to locate and to retrieve the users and the user groups from the respective user table 40 and user groups tables 50, and further generates and displays the user list specifically for the sender user 101. Alternatively, the user list may also include content lists stored in the content lists tables 90 and generated by each one of the users available to communicate in real-time with the sender user 101, if those users have made their content lists available for sharing. Subsequently, the sender user 101 may select a desired content list and request content information from the respective user associated with the selected content list.

In an alternate embodiment, the sender user 101 receives content, such as audio/video data, from the facility 10 in a content player, such as, for example, the Windows Media Player available from Microsoft Corporation of Redmond, Wash. Responsive to a conventional right-click mouse command, the user list described above may be displayed in a window for the sender user 101 to facilitate real-time communication of the content to the recipient user 102. Alternatively, using a genre or artist associated with the received content, the facility 10 filters the user list of potential recipients to show only the users or user groups who have demonstrated a preference for that genre, potentially by having made a purchase, or by a download or stream operation of similar content belonging to the same genre or artist. The sender user 101 further selects the recipient user 102 from the filtered user list. In yet another alternate embodiment, the sender user 101 may select a recipient user group from the user list and may request initiation of a real-time communication session with each user of the recipient user group that is available for real-time communications with the sender user 101.

Figure 4A:
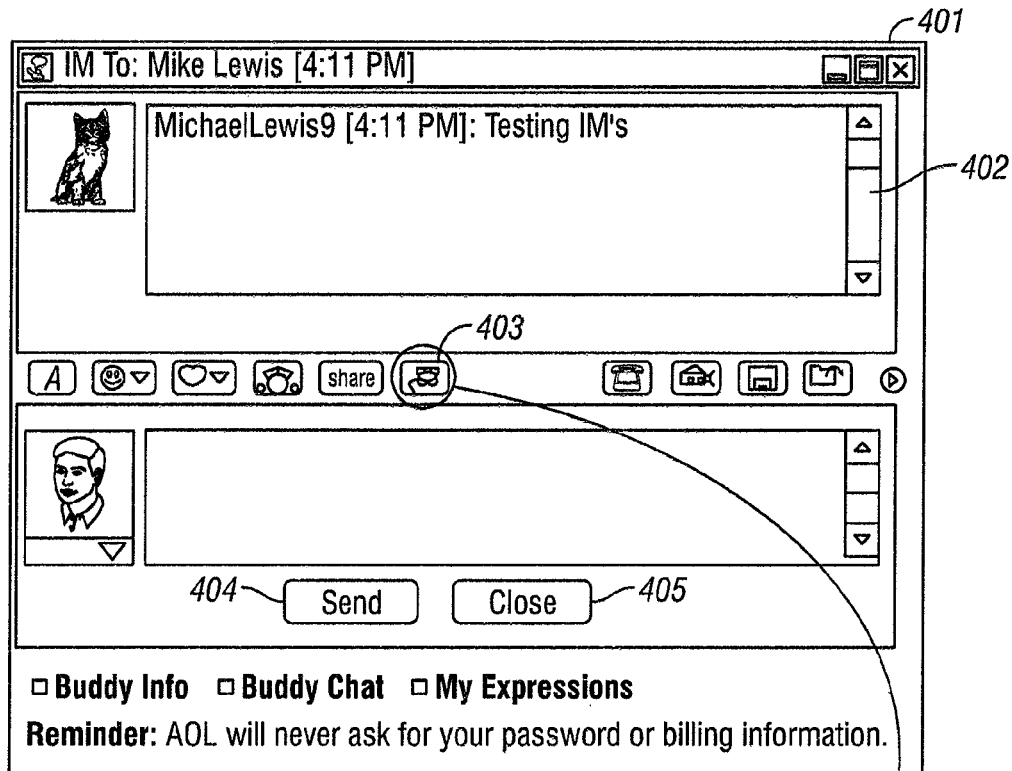
FIGS. 4A-E illustrate exemplary interfaces to facilitate real-time communications and content sharing among users over the network.

At block 110, the facility 10 initiates the real-time communication session between the sender user 101 and the recipient user 102 and displays a message window for the sender user 101 in a user interface area. Referring to FIG. 4A, in one embodiment, the user interface area 401 presented to the sender user 101 further includes the message window 402, such as, for example, an IM message window, and a number of command buttons, including a content sharing button 403, a Send button 404 to send the message to the recipient user 102, and a Close button 405 to close the user interface area 401.

As illustrated in FIG. 3, at block 115, the sender user 101 selects the content sharing button 403 in the user interface area 401 to request content information from the facility 10. Referring to FIG. 4A, in one embodiment, the user interface area 401 facilitates selection of the content sharing button 403 with a conventional mouse click command and facilitates communication of the request to the facility 10.

As illustrated in FIG. 3, at block 120, the facility 10 uses the search servers 20 to conduct a search of the presets tables 60 and the content preferences tables 70 to locate and retrieve the user profile of the sender user 101, specifically the user-generated content preferences and media presets, if any. In an alternate embodiment, the search further extends to local directories of the client machine 32 of the sender user 101 for locally stored content, such as audio and/or video files designated to be shared with other users.

At block 125, the facility 10 dynamically generates multiple links to content information based on the retrieved content preferences and media presets of the sender user 101. For example, in one embodiment, if the sender user 101 has programmed media presets, such as radio station presets, but has not generated any content preferences, the facility 10 generates links for the media presets and, if necessary, generates additional links corresponding to its recommendations, based, for example, on the popularity of the content suggested. Alternatively, if the sender user 101 has generated both content preferences and media presets, the facility 10 generates an equal number of links for the content preferences and for the media presets. In yet another alternate embodiment, if the sender user 101 has generated content preferences, but not media presets, the facility 10 generates links for the content preferences and, if necessary, generates additional links corresponding to its recommendations. Finally, if the sender user 101 has not programmed either the content preferences or the media presets, the facility 10 generates multiple links based on its content suggestions or based on a profile of the sender user 101 built by the facility 10 and based on frequency of access of the content data.

Similarly, in an alternate embodiment, the facility 10 may dynamically generate links to other content information designated by the sender user 101 as available for sharing, such as, for example, locally stored content, stored pictures, images, or other types of content information.

Figure 4B:
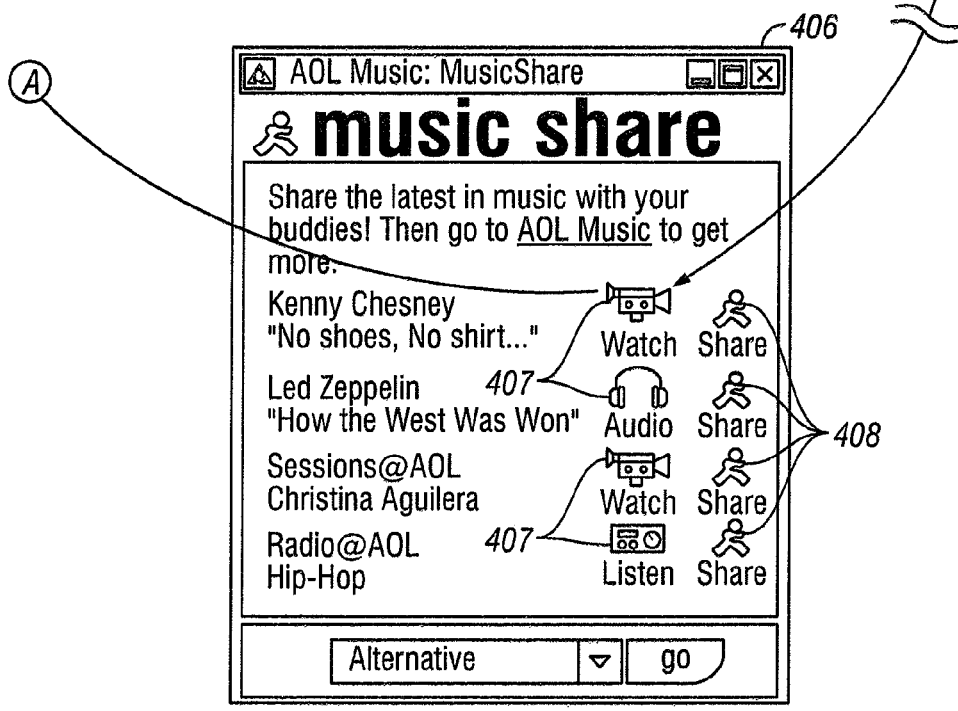

At block 130, the generated links and associated metadata are displayed in a content window for the sender user 101. Referring to FIG. 4B, in one embodiment, a content window 406 is presented to the sender user 101, the content window 406 displaying the facility-generated links to content information. The content window 406 further includes a pair of command icons corresponding to each displayed link, for example a Watch (for video data), Listen (for audio data), or Audio (for a radio station preset) icon 407 and a Share icon 408, actionable through a conventional mouse click command. The content window 406 facilitates selection of an option to play the respective content in a corresponding media player via icons 407, or, respectively, an option to share the content with the recipient user 102 via the Share icon 408. In an alternate embodiment, if links to other types of content information are dynamically generated and displayed for the sender user 101, appropriate command icons may be provided in the content window 406 to facilitate options to access the content with respective content viewers or players or to share it with other users.

Figure 4C:
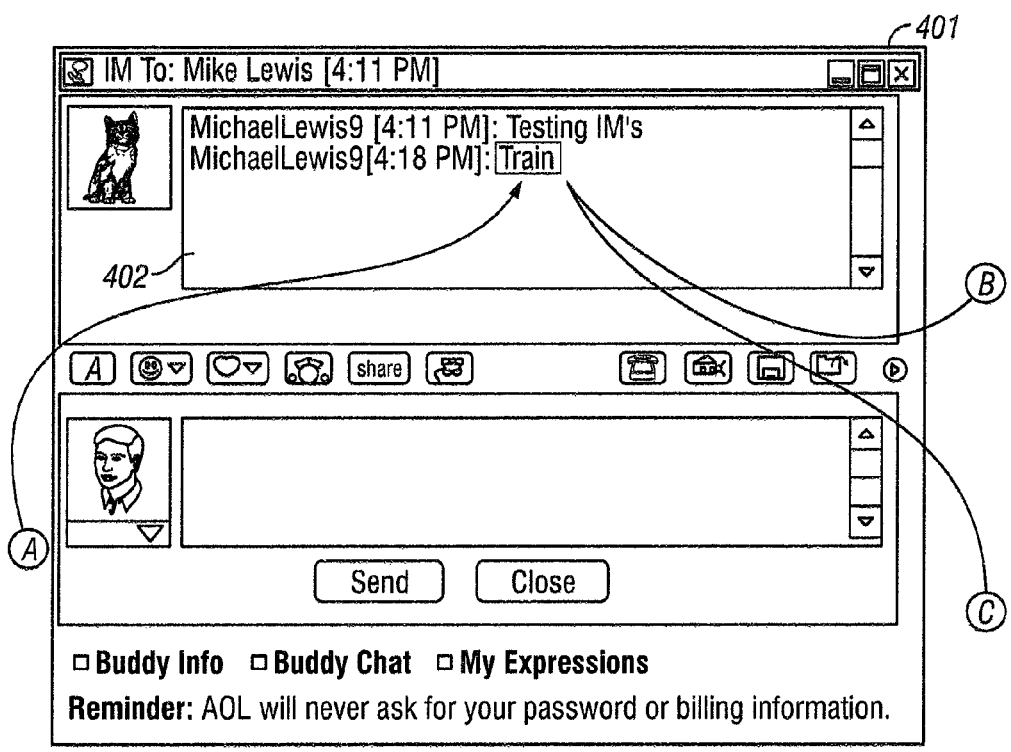

As illustrated in FIG. 3, at block 135, the sender user 101 selects a link to be transmitted to the recipient user 102 through a mouse click on the Share icon 408 of the respective link. At block 140, the selected link is automatically inserted in the message window 402. Referring to FIG. 4C, the facility 10 automatically inserts the selected link and its associated metadata into the message window 402. In one embodiment, the associated metadata includes data pertaining to the content information associated with the link. For example, for a link to an audio file, such as a song track, or a video file, the associated metadata includes the artist's name, the title of the song, the title of the album, and one or more images. In an alternate embodiment, the insertion of a link to locally stored content of the sender user 101 would display the content file name and a request to the recipient user 102 to enter into a peer-to-peer download transmission of the selected locally stored content.

Finally, as illustrated in FIG. 3, at block 145, the facility 10 automatically transmits the real-time IM message containing the selected link and associated metadata to the recipient user 102. In an alternate embodiment, if the sender user 101 already receives content, such as audio/video data, from the facility 10 in a content player, subsequent to the selection of a recipient user 102 from the user list and the display of the message window 402 in the user interface area 401, the facility 10 automatically generates a content link to the content received by the sender user 101, inserts the link in the message window 402, and transmits the content link and its associated metadata to the selected recipient user 102.

Figure 4D:
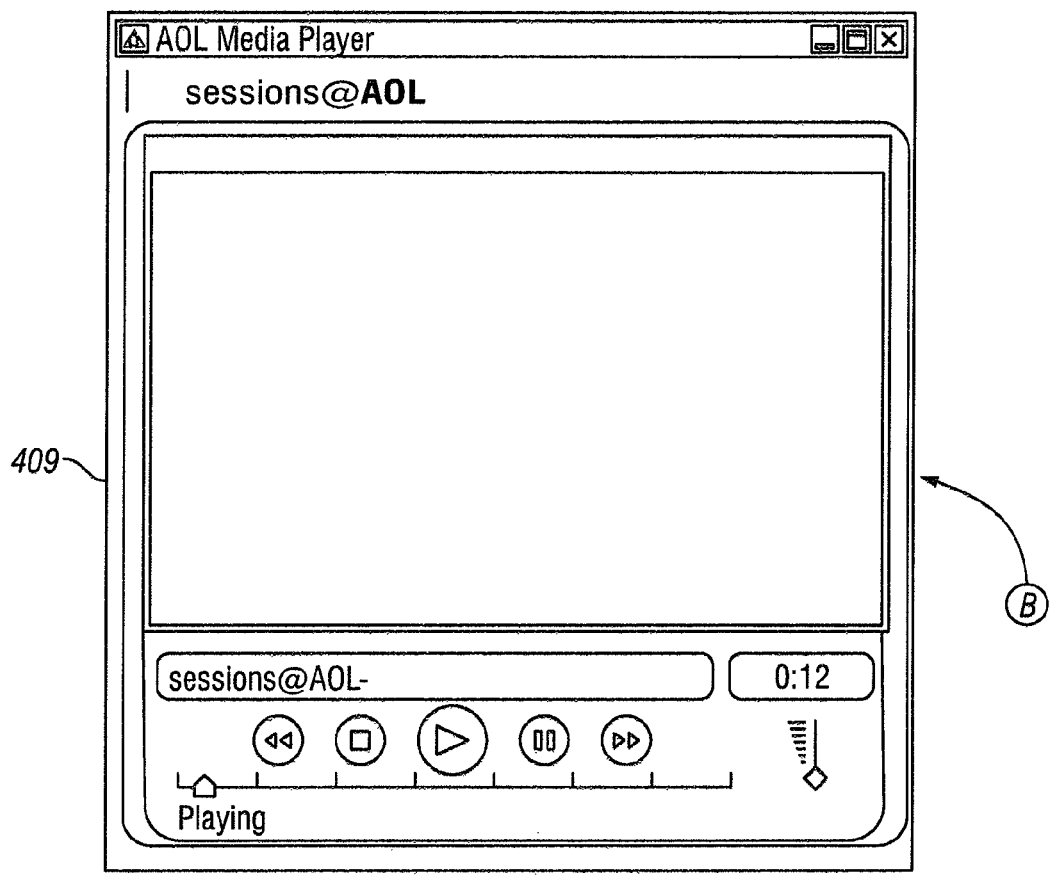

In one embodiment, the real-time IM message containing the selected link and associated metadata is communicated to the recipient user 102 through the communication servers 21 of the facility 10. Upon receipt of the message, the recipient user 102 may accept the content associated with the transmitted link and subsequently download or stream the content through the content servers 16 of the facility 10. Referring to FIG. 4D, by clicking on the link with a conventional mouse click command, the recipient user 102 may open a media player window 409 and download or stream the associated content.

Figure 4E:
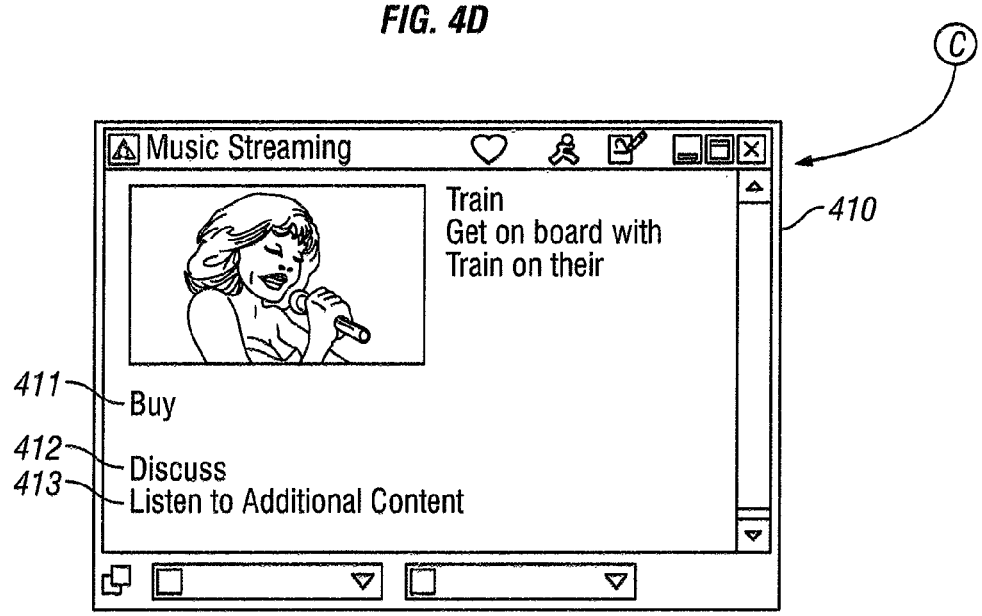

Alternatively, the recipient user 102 may sample the associated content information for a predetermined amount of time and decide whether to accept or decline the content. In another alternate embodiment, the recipient user 102 may review the metadata associated with the transmitted link and make a decision on whether to accept or decline the content. Referring to FIG. 4E, the metadata is displayed in a real-time IM message window 410 for the recipient user 102 and allows the user 102 to see the information associated with the content communicated by the sender user 101. In one embodiment, the message window 410 further includes multiple option links, such as, for example, a Buy option link 411 to facilitate purchase of the content from the facility 10, a Discuss option link 412 to facilitate discussion among users related to the respective content, and a Listen to additional content option link 413 to facilitate retrieval of similar content from the content servers 16. The message window 410 facilitates selection of an option link by the recipient user 102 with a conventional mouse click command and allows real-time communication with the facility 10.

Figure 5:
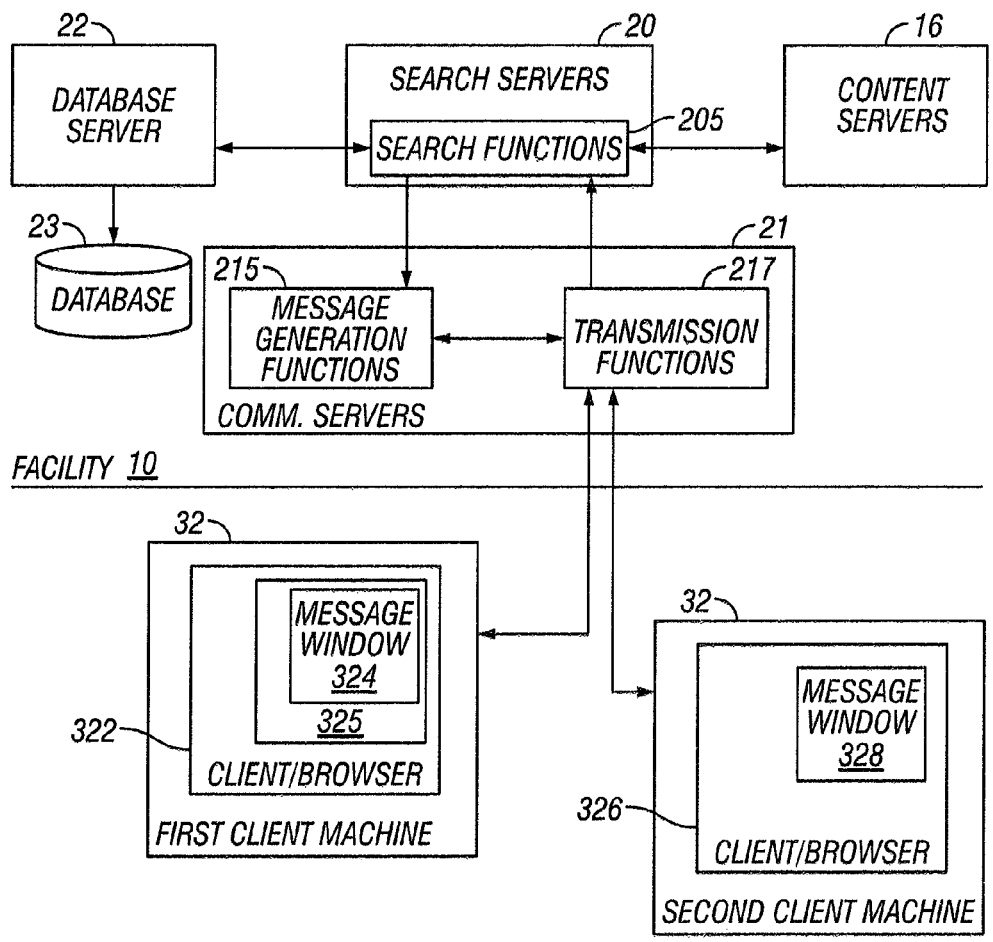
FIG. 5 is a block diagram illustrating an exemplary environment in which the interaction sequence illustrated in FIG. 3 may be employed according to an exemplary embodiment of the invention.

FIG. 5 is a block diagram illustrating an exemplary environment in which the interaction sequence illustrated in FIG. 3 may be employed. As illustrated in FIG. 5, client machines 32 are shown to reside outside the context of a network-based transaction and communications facility, such as the exemplary facility 10 shown in FIG. 1. Accordingly, this embodiment describes an application which allows a sender user 101 of a client machine 32, such as the first client machine 32, to communicate in real-time and to share content with a recipient user 102 of a further client machine 32, such as the second client machine 32, both of which reside outside the facility 10 or any other transaction facility.

Referring to FIG. 5, the sender user 101 selects the recipient user 102 in a client/browser 322 that executes in the first client machine 32 and requests a real-time communication session with the recipient user 102. The recipient user 102 may be selected, in one embodiment, with a conventional mouse click command from a user list containing multiple users and user groups available to communicate in real-time with the sender user 101. The search servers 20 within the facility 10 search the user table 40 and the user groups tables 50 within the database 23 coupled to the database server 22 using search functions 205 to locate and retrieve the users and the user groups, and transmit the data to the communication servers 21. The communication servers 21 use message generation functions 215 and transmission functions 217 to generate and to present the user list specifically for the sender user 101 in the client/browser 322.

Alternatively, the user list may also include content lists stored in the content lists tables 90 and generated by each one of the users available to communicate in real-time with the sender user 101, if those users have made their content lists available for sharing. Subsequently, the sender user 101 may select a desired content list and request content information from the respective user associated with the selected content list. In another alternate embodiment, the sender user 101 receives content, such as audio/video data, from the content servers 16 within the facility 10 in a content player, and, responsive to a conventional right-click mouse command, the user list may be displayed for the sender user 101 in a window or an interactive field within the content player. Alternatively, using the genre or artist associated with the received content, the search servers 20 search the user database 23 and filter the user list of potential recipients to show only the users or user groups who have demonstrated a preference for that genre, potentially by having made a purchase, or by a download or stream operation of similar content belonging to the same genre or artist. The sender user 101 further selects the recipient user 102 from the filtered user list.

In one embodiment, the communication servers 21 initiate the real-time communication session between the sender user 101 and the recipient user 102 and display a message window 324, such as, for example, an IM message window, in a user interface area 325 within the client/browser 322. The user interface area 325 facilitates communication of a request for content information to the communication servers 21 and further to the search servers 20 of the facility 10. The search servers 20 use the search functions 205 to conduct a search of the presets tables 60 and the content preferences tables 70 within the database 23 in order to locate and retrieve the user profile of the sender user 101, specifically the user-generated content preferences and media presets, if any. Subsequently, using the message generation functions 215, the communication servers 21 dynamically generate multiple links to content information based on the retrieved content preferences and media presets of the sender user 101. Alternatively, the communication servers 21 may dynamically generate links to other content information designated by the sender user 101 as available for sharing, such as, for example, locally stored content, stored pictures, images, or other types of content information.

Furthermore, the communication servers 21 use the transmission functions 217 to display the generated links and associated metadata in a content window (not shown) in the client/browser 322. The content window facilitates selection of an option to play the respective content in a corresponding media player or, respectively, an option to share the content with the recipient user 102.

In one embodiment, the sender user 101 selects a link to be transmitted to the recipient user 102 in the message window 324 and the first client machine 32 communicates the link to the communication servers 21. The communication servers 21 use the message generation functions 215 to insert automatically the selected link and its associated metadata into the message window 324 and use the transmission functions 217 to send the real-time IM message containing the selected link and associated metadata to the recipient user 102. The message is shown to be communicated to the communication servers 21 and further to the recipient user 102. Specifically, the message may be communicated, in one embodiment, as a real-time instant message or by utilizing any other transfer protocol or communication.

In an alternate embodiment, if the sender user 101 already receives content, such as audio/video data, from the content servers 16 of the facility 10, subsequent to the selection of a recipient user 102 from the user list and the display of the message window 324 in the user interface area 325, the communication servers 21 automatically generate a content link to the content received by the sender user 101, insert the link in the message window 324, and transmit the link and its associated metadata to the selected recipient user 102 using the transmission functions 217.

In one embodiment, the real-time IM message containing the selected link and associated metadata is communicated to the recipient user 102 through the communication servers 21 of the facility 10 and is displayed in a message window 328 within the client/browser 326 of the second client machine 32. Upon receipt of the message, the recipient user 102 may accept the content associated with the transmitted link and subsequently download or stream the content through the content servers 16 of the facility 10.

Alternatively, the recipient user 102 may sample the associated content information for a predetermined amount of time via the content servers 16 and decide whether to accept or decline the content. In another alternate embodiment, the recipient user 102 may review the metadata associated with the link and decide whether to accept or decline the content. The metadata may be displayed in the message window 328 for the recipient user 102 and allows the user 102 to see the information associated with the content communicated by the sender user 101.

Figure 6:
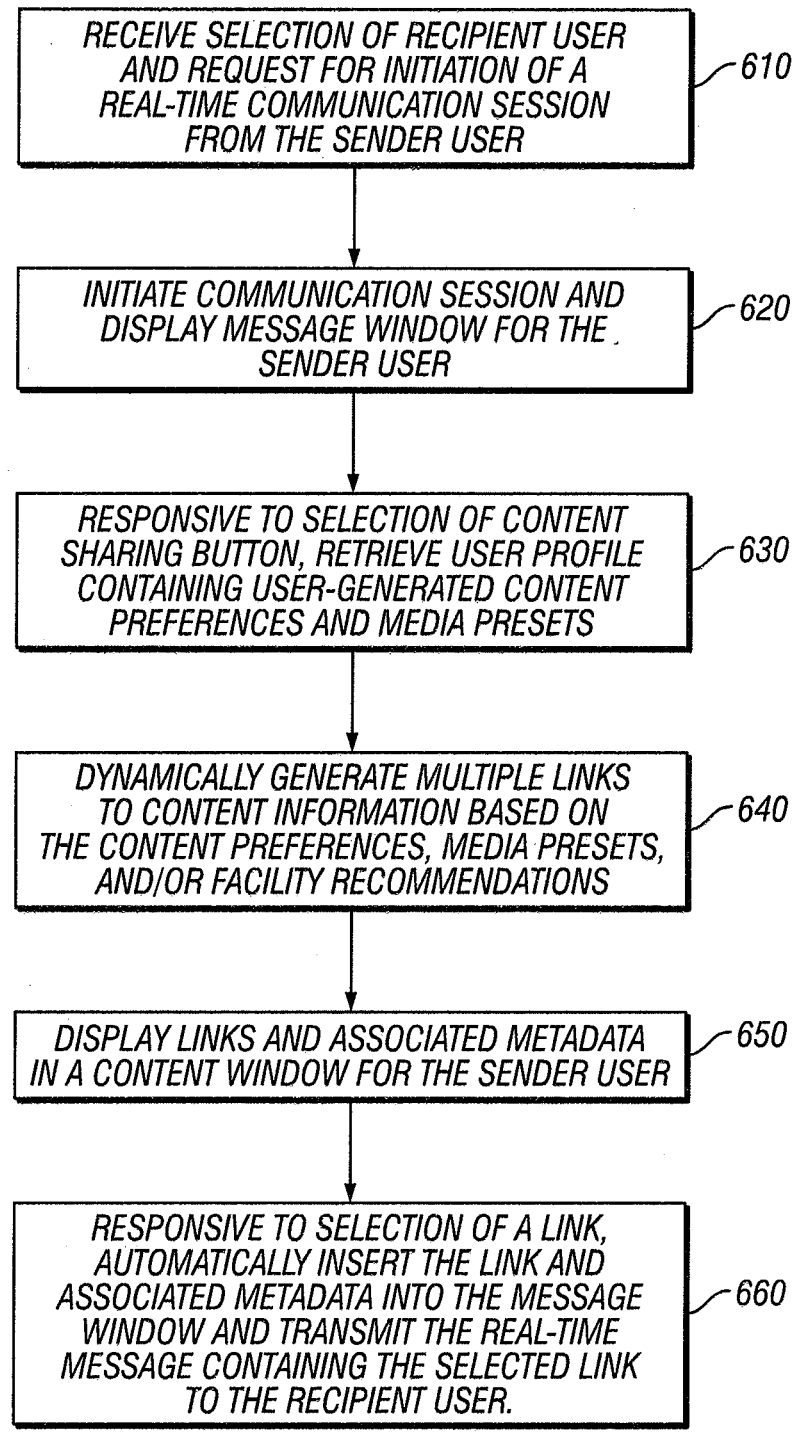
FIG. 6 is a flow chart illustrating a method to facilitate real-time communications and content sharing among users over a network according to an exemplary embodiment of the invention.

FIG. 6 is a flow chart illustrating a method to facilitate real-time communications and content sharing among users over a network. As illustrated in FIG. 6, at processing block 610, selection of the recipient user 102 and a request for initiation of a real-time communication session is received from the sender user 101.

At processing block 620, the communication session is initiated between the sender user 101 and the recipient user 102 and a message window 402 is displayed in a user interface area 401 for the sender user 101. At processing block 630, in response to the selection of a content sharing button 403 within the user interface area 401, a user profile of the sender user 101 containing user-generated content preferences and user-generated media presets is retrieved.

At processing block 640, multiple links to content information are generated based on the retrieved content preferences and media presets, and on facility-generated recommendations. At processing block 650, the links and associated metadata are displayed in a content window for the sender user 101.

At processing block 660, in response to selection of a link to be transmitted to the recipient user 102, the selected link and its associated metadata are automatically inserted into the message window and the real-time message containing the selected link is transmitted to the recipient user 102.

Figure 7:
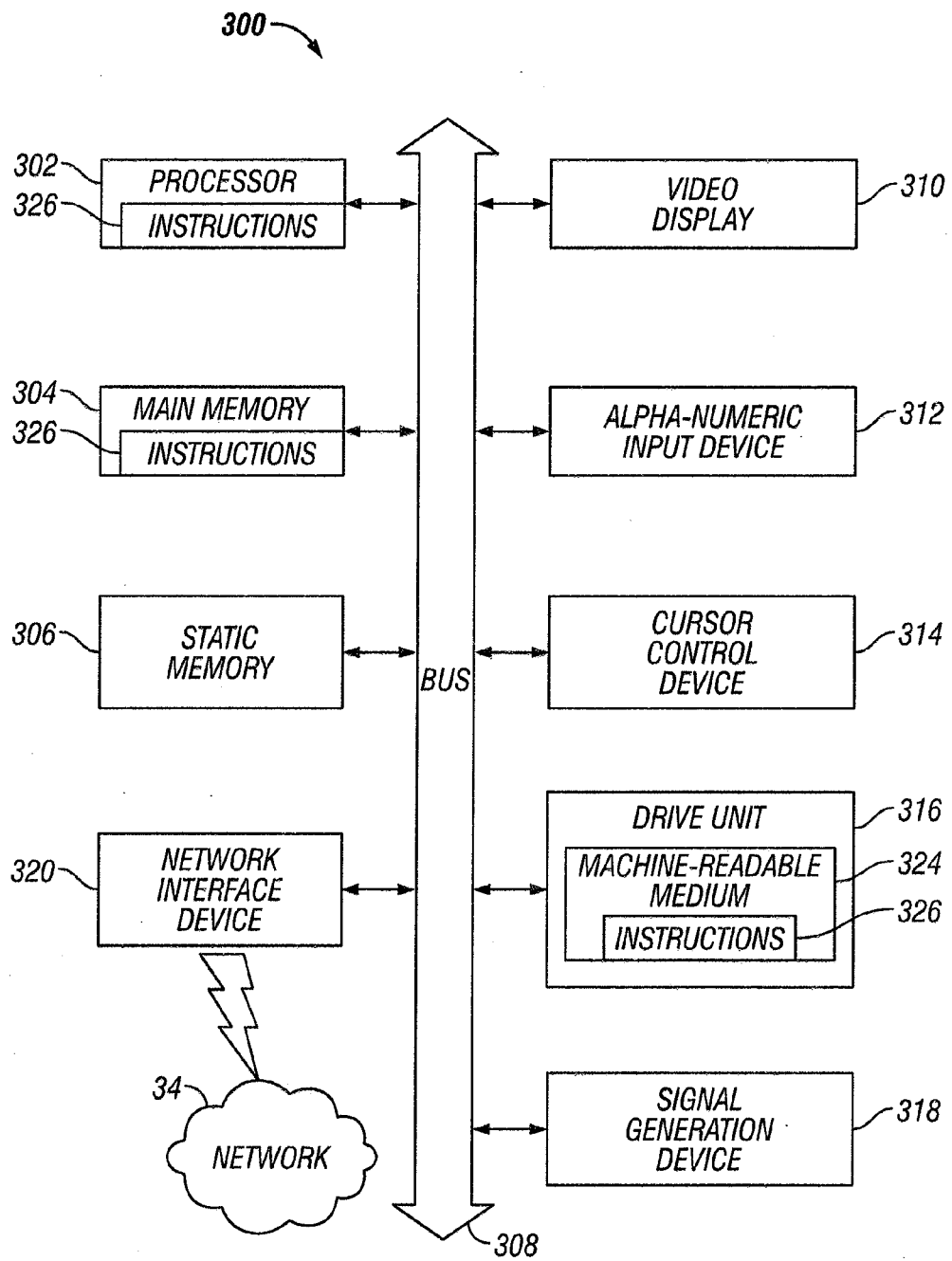
FIG. 7 is a diagrammatic representation of a machine in the exemplary form of a computer system within which a set of instructions may be executed.

FIG. 7 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310, e.g. a liquid crystal display (LCD) or a cathode ray tube (CRT). The computer system 300 also includes an alphanumeric input device 312, e.g., a keyboard, a cursor control device 314, e.g. a mouse, a disk drive unit 316, a signal generation device 18, e.g. a speaker, and a network interface device 320.

The disk drive unit 316 includes a machine-readable medium 324 on which is stored a set of instructions, i.e. software, 326 embodying any one, or all, of the methodologies described above. The software 326 is also shown to reside, completely or at least partially, within the main memory 304 and/or within the processor 302. The software 326 may further be transmitted or received via the network interface device 320.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method comprising:
    enabling, using at least one processor, a communication session between a first user and a second user of a communication system;
    receiving, during the communication session, a request by the first user to share content with the second user;
    searching one or more databases, remote from the first user and the second user, for content that is available for the first user to share with the second user;
    generating, based on the results from the search for available content and further based on one or more previous content selections by the first user, a plurality of selectable options for sharing content, wherein each of the plurality of selectable options corresponds to an available piece of content;
    enabling, during the communication session, presentation of the plurality of selectable options to the first user;
    detecting a selection, by the first user, of a particular selectable option from the plurality of selectable options, wherein the particular selectable option is associated with a particular piece of content; and
    sharing, in response to the detected selection, the particular piece of content with the second user.

2. The method of claim 1, wherein the communication session is presented within a user interface.

3. The method of claim 2, wherein enabling presentation of the plurality of selectable options to the first user comprises providing the plurality of selectable options within a second user interface in conjunction with the user interface.

4. The method of claim 3, wherein the second user interface is a context window.

5. The method of claim 3, wherein detecting the selection of the particular selectable option from the plurality of selectable options by the first user comprises detecting the selection of the particular selectable option from within the second user interface.

6. The method of claim 2, further comprising embedding the particular piece of content within the user interface in response to detecting the selection of the particular selectable option from the plurality of selectable options.

7. The method of claim 6, wherein sharing the particular piece of content with the user further comprises sharing the embedded particular piece of content with the second user.

8. The method of claim 2, wherein the user interface comprises at least one of an instant message, a webpage, or an email.

9. The method of claim 1, wherein the particular piece of content shared with the second user is one of a picture, a video, or an audio file.

10. The method of claim 1, wherein sharing the particular piece of content comprises sending one of a link, an icon, or metadata.

11. The method of claim 1, wherein detecting the selection further comprises automatically inserting the particular piece of content in the communication session.

12. The method of claim 1, wherein sharing the particular piece of content comprises sending the particular piece of content to the second user.

13. The method of claim 1, wherein sharing further comprises sharing the particular piece of content within a user interface area.

14. The method of claim 1, wherein a sample of the particular piece of content is shared with the second user.

15. The method of claim 1, wherein sharing the particular piece of content further comprises sharing the particular piece of content with a third user via the communication session.

16. A system comprising:
    at least one processor; and
    at least one non-transitory computer readable storage medium storing instructions thereon that, when executed by the at least one processor, cause the system to:
    enable a communication session between a first user and a second user of a communication system;
    receive, during the communication session, a request by the first user to share content with the second user;
    search one or more databases, remote from the first user and the second user, for content that is available for the first user to share with the second user;
    generate, based on the results from the search for available content and further based on one or more previous content selections by the first user, a plurality of selectable options for sharing content, wherein each of the plurality of selectable options corresponds to an available piece of content;
    enable, during the communication session, presentation of the plurality of selectable options to the first user;
    detect a selection, by the first user, of a particular selectable option from the plurality of selectable options, wherein the particular selectable option is associated with a particular piece of content; and
    share, in response to the detected selection, the particular piece of content with the second user.

17. A non-transitory computer readable medium storing instructions thereon that, when executed by at least one processor, cause the at least one processor to perform the steps of:
    enabling a communication session between a first user and a second user of a communication system;
    receiving, during the communication session, a request by the first user to share content with the second user;
    searching one or more databases, remote from the first user and the second user, for content that is available for the first user to share with the second user;
    generating, based on the results from the search for available content and further based on one or more previous content selections by the first user, a plurality of selectable options for sharing content, wherein each of the plurality of selectable options corresponds to an available piece of content;
    enabling, during the communication session, presentation of the plurality of selectable options to the first user;
    detecting a selection, by the first user, of a particular selectable option from the plurality of selectable options, wherein the particular selectable option is associated with a particular piece of content; and sharing, in response to the detected selection, the particular piece of content with the second user.

18. The method of claim 1, wherein the particular piece of content shared with the second user is a video.

19. The method of claim 1, further comprising receiving, at a server device and from the first user, a search request and searching the one or more databases for content responsive to the search request.

20. The system of claim 16, further comprising instructions that, when executed by the at least one processor, cause the system to receive, at a server device and from the first user, a search request, and search the one or more databases for content responsive to the search request.

21. The non-transitory computer readable medium of claim 17, further comprising instructions that, when executed by the at least one processor, cause the at least one processor to receive, at a server device and from the first user, a search request, and search the one or more databases for content responsive to the search request.

22. The method of claim 1, wherein sharing the particular piece of content with the second user comprises sending metadata associated with the particular piece of content to the second user.

23. The method of claim 1, wherein sharing the particular piece of content with the second user further comprises providing access to a non-selected piece of content as a recommendation based on the detected selection of the particular piece of content.

24. The method of claim 1, further comprising:

accessing a user profile associated with the first user; and wherein generating the plurality of selectable options for sharing content is further based on the user profile.

* * * * *